United States Patent
Mannesson et al.

(10) Patent No.: US 12,429,574 B2
(45) Date of Patent: Sep. 30, 2025

(54) STATIC SCENE MAPPING USING RADAR

(71) Applicant: Axis AB, Lund (SE)

(72) Inventors: Anders Mannesson, Lund (SE); Anton Sedin, Lund (SE); Aras Papadelis, Lund (SE); David Wadmark, Lund (SE); Sebastian Heunisch, Lund (SE); Stefan Adalbjörnsson, Lund (SE); Daniel Ståhl, Lund (SE)

(73) Assignee: Axis AB, Lund (SE)

( * ) Notice: Subject to any disclaimer, the term of this patent is extended or adjusted under 35 U.S.C. 154(b) by 558 days.

(21) Appl. No.: 17/748,222

(22) Filed: May 19, 2022

(65) Prior Publication Data
US 2022/0373669 A1   Nov. 24, 2022

(30) Foreign Application Priority Data
May 21, 2021   (EP) .................................... 21175384

(51) Int. Cl.
*G01S 13/536* (2006.01)
*G01S 7/35* (2006.01)
*G01S 7/41* (2006.01)
*G01S 13/89* (2006.01)

(52) U.S. Cl.
CPC ............ *G01S 13/536* (2013.01); *G01S 7/356* (2021.05); *G01S 7/415* (2013.01); *G01S 13/89* (2013.01)

(58) Field of Classification Search
CPC ........ G01S 13/536; G01S 7/356; G01S 7/415; G01S 13/89
See application file for complete search history.

(56) References Cited

U.S. PATENT DOCUMENTS

2009/0309785 A1   12/2009   Nalezinski et al.
2014/0191899 A1   7/2014   Pickle et al.
(Continued)

FOREIGN PATENT DOCUMENTS

CN   107300698 A   10/2017
CN   110412516 B   5/2021
(Continued)

OTHER PUBLICATIONS

Clarke et al., "Towards mapping of dynamic environments with FMCW radar," IEEE Intelligent Vehicles Symposium, Proceedings. 140-145 (2013).
(Continued)

*Primary Examiner* — Ladimir Magloire
*Assistant Examiner* — Nazra Nur Waheed
(74) *Attorney, Agent, or Firm* — Volpe Koenig (57) ABSTRACT

A method for mapping a static scene using a stationary radar unit operative to transmit radar signals towards a scene, the stationary radar unit comprises a set of receiver antennas configured to detect radar signals from arbitrary directions, and the stationary radar unit is configured to measure target velocity in discrete velocity bins, the method comprising: continuously collecting radar signals over time to detect a static scene using the set of receiver antennas; constructing an occupancy map of the static scene using confirmed detections determined from the collected radar signals, where confirmed detections are detections with radar signal strength exceeding a detection threshold and with velocity falling in a zero velocity bin and detections with radar signal strength exceeding the detection threshold and with a non-zero velocity sufficiently low to cause spill over information in the same bin as detections falling in the zero velocity bin.

19 Claims, 8 Drawing Sheets

(56) References Cited

U.S. PATENT DOCUMENTS

| | | |
|---|---|---|
| 2016/0349363 A1 | 12/2016 | Millar et al. |
| 2019/0018133 A1 | 1/2019 | Takada |
| 2019/0061758 A1 | 2/2019 | Ide |
| 2020/0103523 A1* | 4/2020 | Liu .................. G01S 13/87 |
| 2020/0278444 A1* | 9/2020 | Va ................... G06V 40/172 |
| 2020/0293860 A1 | 9/2020 | Grassmann |
| 2021/0096210 A1* | 4/2021 | Maher ............... G06F 3/0661 |
| 2021/0104027 A1 | 4/2021 | Longman et al. |
| 2021/0349181 A1* | 11/2021 | Nishikido .......... G01S 13/42 |
| 2023/0080655 A1* | 3/2023 | Yomo ................ G01S 7/292 |
| | | 342/450 |

FOREIGN PATENT DOCUMENTS

| | | |
|---|---|---|
| DE | 102019216373 A1 | 4/2021 |
| DE | 102021001452 A1 | 5/2021 |
| KR | 10-2020-0108646 A | 9/2020 |
| WO | 2019/215734 A1 | 11/2019 |
| WO | 2020071243 A1 | 4/2020 |

OTHER PUBLICATIONS

Ryu et al., "Detecting Ghost Targets Using Multilayer Perceptron in Multiple-Target Tracking," Symmetry 2018, 10, 16 (2018).

Prophet et al., "Instantaneous Ghost Detection Identification in Automotive Scenarios," 2019 IEEE Radar Conference (RadarConf), pp. 1-6, (2019).

United States Office Action issued on May 1, 2024 for U.S. Appl. No. 17/748,223.

United States Office Action issued on Aug. 28, 2024 for U.S. Appl. No. 17/748,223.

Korean Office Action issued on Mar. 14, 2025 for Korean Patent Application No. 10-2022-0060479.

* cited by examiner

STATIC SCENE MAPPING USING RADAR

FIELD OF INVENTION

The present disclosure generally relates to the field of radar imaging, and in particular to a method and control unit for mapping of a static scene using a stationary radar unit.

TECHNICAL BACKGROUND

The basis of radar detection is that a transmitted radar signal is reflected off an object and detected by antennas of the radar. By suitable signal processing properties such as object velocity and position relative the radar can be estimated.

Radar mapping of static installations may be performed by utilizing a sweeping radar, where the radar antennas are spatially moved such that the detection area is detected from different angles. In some applications the radar is naturally under movement such as for example in the automotive industry where the radar is mounted on the vehicle to detect the surroundings of the vehicle.

A common type of radar is based on so-called range-doppler measurements. Typically, a range-doppler measurement radar detects combinations of a certain distance and velocity of a target. However, this type of measurements is most suitable for detection of moving objects, and not static, motionless objects in the detection area.

A common approach to increasing the resolution of static images detected by radars is to massively increase the number of antennas and employ complicated and computationally expensive signal processing. Increasing the number of antennas is costly and generally not desirable and the computationally expensive signal processing undesirably increases the requirements on the processor.

Accordingly, there is room for improvement regarding detecting static installations with radar.

SUMMARY

In view of above-mentioned and other drawbacks of the prior art, providing a method for mapping of a static scene using a stationary radar unit alleviates at least some of the drawbacks of prior art.

According to a first aspect of the present disclosure, it is therefore provided a method for mapping of a static scene using a stationary radar unit operative to transmit radar signals towards a scene, the stationary radar unit comprises a set of receiver antennas configured to detect radar signals from arbitrary directions, and the stationary radar unit is configured to measure target velocity in discrete velocity bins. The method comprises the following steps. Continuously collecting radar signals over time to detect a static scene using the set of receiver antennas. In a further step, constructing an occupancy map of the static scene using confirmed detections determined from the collected radar signals. Confirmed detections are detections with radar signal strength exceeding a detection threshold and with velocity falling in a zero velocity bin and detections with radar signal strength exceeding the detection threshold and with a non-zero velocity sufficiently low to cause spill over information in the same bin as detections falling in the zero velocity bin.

The present disclosure is based upon the realization to include not only detections of static objects, but also detections that are nearly static, for construction a map of static objects in the scene. Information related to detection of nearly static objects is often discarded since it may be spill-over information in a nearly static region from static detections, i.e., information that may already have been considered form a static detection. Further, a radar detection of a moving object will also cause spill-over information into the same nearly static region. Thus, the information in the nearly static region comprises a sum of spill-over information from the static objects and from moving objects.

It is beneficial to use information related to detections of targets having non-zero velocity for constructing a map of a static scene.

The radar measures the velocity in discrete steps such that a detected velocity falls in one of several bins. The detection of velocity is thus performed for e.g., velocity 0, $-\Delta V$, $+\Delta V$, where $\Delta V$ is the size of a bin. Thus, the radar unit is operative according to a threshold setting to include detections with a signal strength exceeding a threshold and with a speed being zero, or exceeding zero but being within $+/-\Delta V$. Due to spill-over, each detection related to the zero bin, the $-\Delta V$ bin or the $+\Delta V$ bin, may comprise detections from a static object and detections of a moving object.

With sufficiently low velocity to cause spill over information may be interpreted as being with sufficiently low velocity such that there will be correlation or linear dependence between the frequencies corresponding to the target at zero velocity with the target at non-zero velocity.

In addition to measuring velocity in discrete velocity bins, the stationary radar unit may also measure target range in discrete range bins and optionally also angle of arrival of a radar signal in discrete bins. This leads to spill-over information between target range bins and between angle of arrival bins.

Spill over information may be considered spectral leakage, i.e., that during signal processing including e.g., a discrete Fourier transform, the lobe or "tone" in the discrete Fourier transform related to the detected velocity, spread to other frequencies, e.g., velocities. Similarly, during signal processing including e.g., a discrete Fourier transform, the lobe or "tone" in the discrete Fourier transform related to a detected range or angle of arrival of a detected signal, spread to other frequencies, e.g., other nearby range bins or angle of arrival bins.

Stationary radar should be interpreted as radar that does not have moving parts that sweep the scene. Instead, the radar is adapted to detected signals from all directions without using beamforming or sweeping. Further, a stationary radar is mounted on a stationary position and not on a moving entity such as a vehicle. Thus, the stationary radar unit is not moving relative the static scene.

Continuous collection of radar signals should be interpreted as being performed in periodic intervals defined by time frames or just "frames".

Measuring a velocity is preferably performed by transmitting a periodic radar signal. Suitable transmit signals are periodically repeating pulsed signals, frequency modulated sequences, in particular linear frequency sweeps as used for frequency modulate continuous wave radars (FMCW), phase modulated signals, or multi-carrier signals as for instance Orthogonal frequency-division multiplexing (OFDM).

Signal processing of the radar signals may be performed in various ways known per se. Some examples include range compression with a matched filter. For FMCW signals with stretch processing this can be implemented by a Fourier Transform or other frequency estimation algorithms (MUSIC, CAPON, . . . ). Other suitable implementations might be a correlation with the transmit signal or a frequency domain implementation of the matched filter.

Further, doppler compression may be performed including analyzing the periodicity of the transmit signal and detecting a Doppler shift. This is commonly done with a FFT or other frequency estimation algorithms mentioned above.

Further, angle-of-arrival estimation in the antenna array may be performed by estimating the phase steering vector between antennas with an FFT. Other techniques might be the above-mentioned frequency estimation techniques.

By means of embodiments of the present disclosure, the herein described method provides for mapping of a static scene using a radar with relatively few antennas and computationally cheap signal processing.

In embodiments, the number of receiver antennas of is no more than 16, preferably no more than 10, more preferably no more than 8. Accordingly, the radar unit may be of a relatively simple and less-costly type. A receiver antenna may be a physical antenna or a virtual antenna. The antennas may be implemented as virtual antennas of a MIMO (multiple-in multiple-out) radar.

In embodiments, constructing the occupancy map may comprise, over time including, in the occupancy map, all detections with radar signal strength exceeding the detection threshold and with no velocity and all detections with radar signal strength exceeding the detection threshold and with non-zero velocity, for each of a set of discrete radii from a radar location. Accordingly, the radar unit is configured to, for each of a set of discrete radii, mark all detections fulfilling the detection and velocity threshold. For example, all detections with velocity falling within the 0, −ΔV, +ΔV, −threshold, are marked in the occupancy map.

In a more concrete example, the occupancy map be constructed by including, one radar detection for each combination of discrete radii from the radar location and a detection related to a velocity bin neighboring a zero-velocity bin.

In embodiments, constructing the occupancy map may comprise, for each confirmed detection, increase an occupancy probability value in a corresponding first region of the occupancy map, and reducing a probability value in regions between the first region and the location of the radar in the occupancy map. This is an efficient way to construct the occupancy map that takes into account detections of moving objects. Advantageously, it enables averaging the detections over time to build the map, where static objects will appear and moving objects are averaged out. The degree of increase and/or decrease of the probability values is a tuning parameter that may be tuned to the specific implementation. The tuning parameter effectively controls the speed of building the occupancy map, that is, how quickly the probability values approach a set limit.

Preferably, the regions between the first region and the location of the radar in the occupancy map intersect a straight line between the first region and the location of the radar in the occupancy map. The straight line indicates a free line of sight between the radar unit and the first region. Since no further objects are present in a free line of sight, the probability values in regions between the first region and the radar unit may reliably be reduced to improve the contrast in the occupancy map between regions with static objects and regions with no static objects. Objects located on the straight line but beyond the first region as regarded from the radar unit position, are completely or partially shadowed.

Further, while constructing the occupancy map, it may be included to increase the occupancy probability value in regions neighboring the first region. Hereby, uncertainties in the measured target range and angle of arrival may be accounted for in the occupancy map. The increase may be performed according to a probability function, e.g., the closer to the first region the larger probability increase, with declining probability increase with increasing distance from the first region.

In order to construct an accurate occupancy map, the occupancy map may be constructed as an aggregate of the probability values over time. Since the occupancy map is effectively an aggregated estimate of the detected environment, the variance of this estimate is reduced by averaging over many measurements in time.

In embodiments, constructing the occupancy map may comprise determining an azimuth angle of the confirmed detections by means of selecting a frequency with the largest energy content of a Fourier transform of phase differences between radar signals collected by different receiver antennas separated along a first axis. The first axis corresponds to a horizontal axis of the scene when the radar unit is in use.

In embodiments, constructing the occupancy map may comprise determining an elevation angle of the confirmed detections by means of selecting a frequency with the largest energy content of a Fourier transform of phase differences between radar signals collected by different receiver antennas separated along a second axis. The second axis corresponds to a vertical axis of the scene when the radar unit is in use.

Embodiments of the present disclosure are applicable to various types of stationary radar units. In one preferred embodiment is the stationary radar unit is a frequency-modulated continuous wave radar. Further, the stationary radar unit may be operative to transmit radar signals in all directions.

According to a second aspect of the present disclosure, there is provided computer program comprising instructions which, when the program is executed by a computer, cause the computer to carry out the method of any of the herein discussed embodiments.

Further embodiments of, and effects obtained through this second aspect of the present disclosure are largely analogous to those described above for the first aspect of the disclosure.

According to a third aspect of the present disclosure, there is provided a control unit for mapping of a static scene using radar signals collected by a stationary radar unit operative to transmit radar signals towards a scene and to detect radar signals from arbitrary directions using a set of receiver antennas, the stationary radar unit is configured to measure target velocity in discrete velocity bins, the control unit is configured to: acquire data indicative of radar signals continuously collected over time to detect a static scene; construct an occupancy map of the static scene using confirmed detections determined from the acquired data, where confirmed detections are detections with radar signal strength exceeding a detection threshold and with velocity falling in a zero velocity bin and detections with radar signal strength exceeding the detection threshold and with a non-zero velocity sufficiently low to cause spill over information in the same bin as detections falling in the zero velocity bin.

Further embodiments of, and effects obtained through this third aspect of the present disclosure are largely analogous to those described above for the first aspect and the second aspect of the disclosure.

There is further provided a system comprising a stationary radar unit and a control unit according to the third aspect. The system provides similar advantages and features as any one of the herein described embodiments.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

Turning now to the drawings and to FIG. 1 in particular, there is shown a scene 1 comprising a set of static objects 102a-d and a moving object 104. A stationary radar unit 100 is configured to map the scene 1 including the moving object 104 and the static objects 102a-d. To measure velocity the transmission of a periodic signal is advantageously used. Suitable transmit signals are periodically repeating pulsed signals, frequency modulated sequences, such as linear frequency sweeps as used for FMCW, phase modulated signals, or multi-carrier signals as for instance OFDM.

Figure 1A:
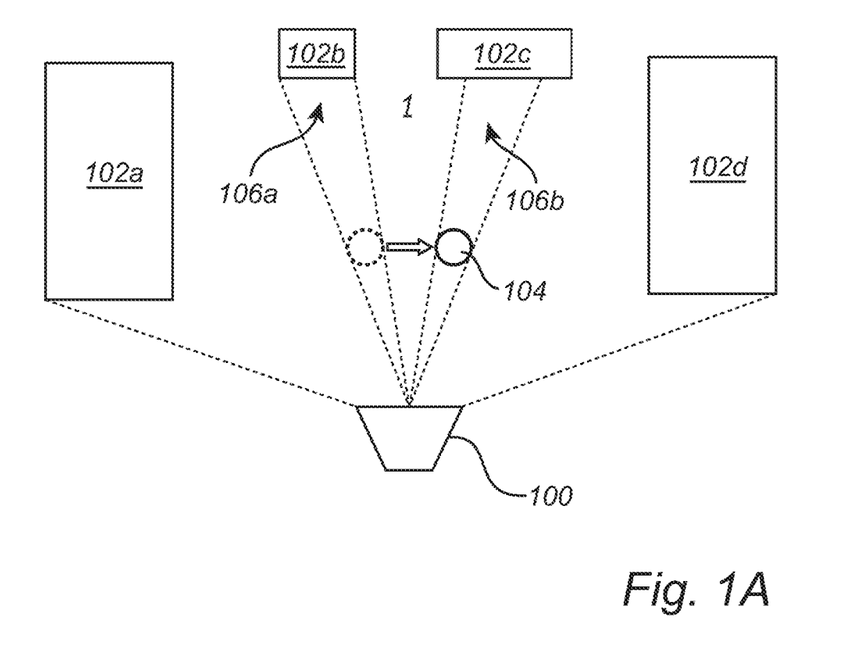
FIG. 1A conceptually illustrates a stationary radar unit arranged to acquire radar detections from a scene comprising static objects and a moving object.

The radar unit 100 generally detects the strongest signal for each radius or range from the location of the radar unit 100. Thus, if the scene is not changing and is completely static, the same strongest object will be observed over time, and the observed static object is often smeared out across the azimuthal for each range. However, if a small interference is introduced in the scene 1, such as a moving object 104, the scene is changing and therefore may also the strongest detections change. This may cause less dominant features of the scene to appear. For example, the moving object 104 firstly causes occlusion of the region 106a of the object 102b, and at a later time causes occlusion of the region 106b of the object 102c. Without the moving object 104, the smaller static object 102b may not be detected as the strongest detection due to the static object 102c being the dominant feature, however, when the moving object 104 covers part of the static object 102c, the less dominant object 102b may be detected and appear more dominant.

During mapping of the scene, the radar unit 100 include detections of objects with zero velocity, i.e., detections of objects 102a-d. Detection of objects, which include sampling of radar detections at discrete times, is performed also for discrete velocities, herein referred to as velocity bins. Processing of data in this way causes spill-over into neighboring bins due to spectral leakage. In a similar way, detections of a moving object 104, causes spill-over into neighboring bins due to spectral leakage. If the object is moving sufficiently slow, the detection will spill-over into the same bin as the static detections, thus this velocity bin will comprise the sum of the spill-over from the static detection and from the low-velocity detection. Thus, by using appropriate detection thresholds, as in the herein proposed method, these static fluctuations in the static detections, due to the spill-over information, lead to that different objects and features of the scene will be observed over time.

Further to the above discussion, using a stationary radar unit, such as a frequency modulated continuous wave radar, one object per discrete range, i.e., per range bin, is detected per discrete velocity bin. Thus, even if more than one object is present at the same range and velocity only one object is detected.

An object is detected if the radar signal exceeds a detection threshold, and for each detected object may a discrete range, a discrete radial velocity, an azimuthal angle, and a signal strength be measured. For each discrete radius, mark in an occupancy map all detections with velocity falling in the zero-velocity bin and all detections falling in the velocity bins neighboring the zero-velocity bin.

If the object 104 is moving sufficiently slowly, one or more of the combinations (R0, zero velocity), (R0, +ΔV velocity), and (R0, −ΔV velocity) will contain a sum of stationary detections and moving detections. Since only one detection per combination is made, there is a chance that these combinations are not the same as without the presence of the moving object 104. In other words, new information is added to the map.

When the moving target 104 moves at a given radius, R0, and azimuthal, it will shadow objects, i.e., 102b, 102c are behind object 104 as seen by the radar unit 100 at different times or frames. Thus, when the moving object is in front of a static object, e.g., 102b, 102c, reflections from these objects become weaker, whereas other reflections from the same range is/are the same. Thus, also in this case, the combinations of (R0, zero velocity), (R0, +ΔV velocity), and (R0, −ΔV velocity) contain new information that can be added to the map.

Figure 1B:
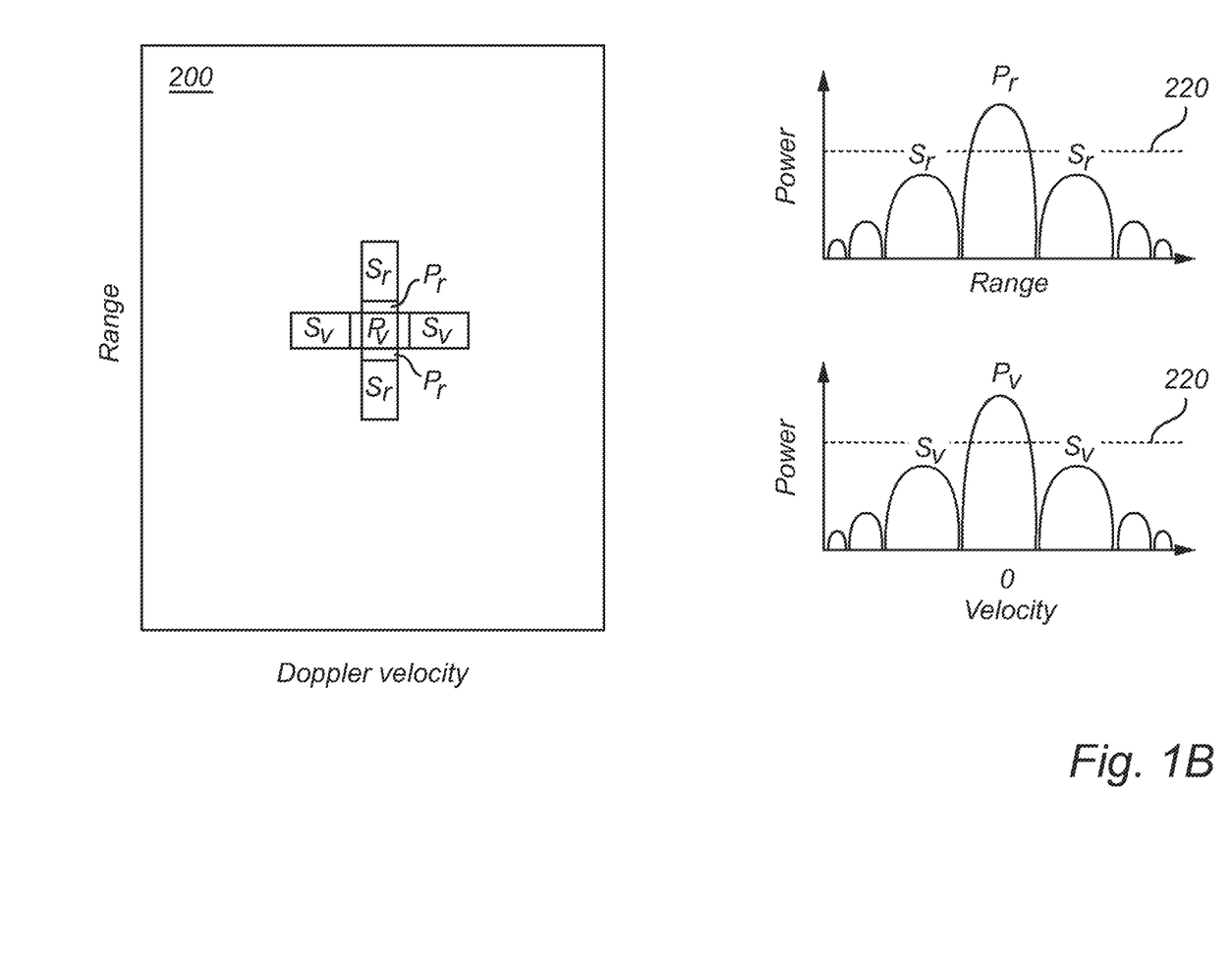
FIG. 1B is a conceptual range-doppler diagram and a power versus range diagram of a static object.

More specifically, turning to FIG. 1B, there is shown a conceptual range-doppler plot 200. On the x-axis is the doppler velocity shown where a radar signal measurement indicates a center peak Pv and side lobes Sv. Further, on the y-axis is shown a center peak Pr and side lobes Sr. The corresponding power graphs are shown and indicate the main lobes Pr and Pv in the Fourier transforms of the collected detections. If a detection exceeds a detection threshold, i.e., if a peak has an amplitude exceeding the detection threshold 220, a detection is considered confirmed.

Figure 1C:
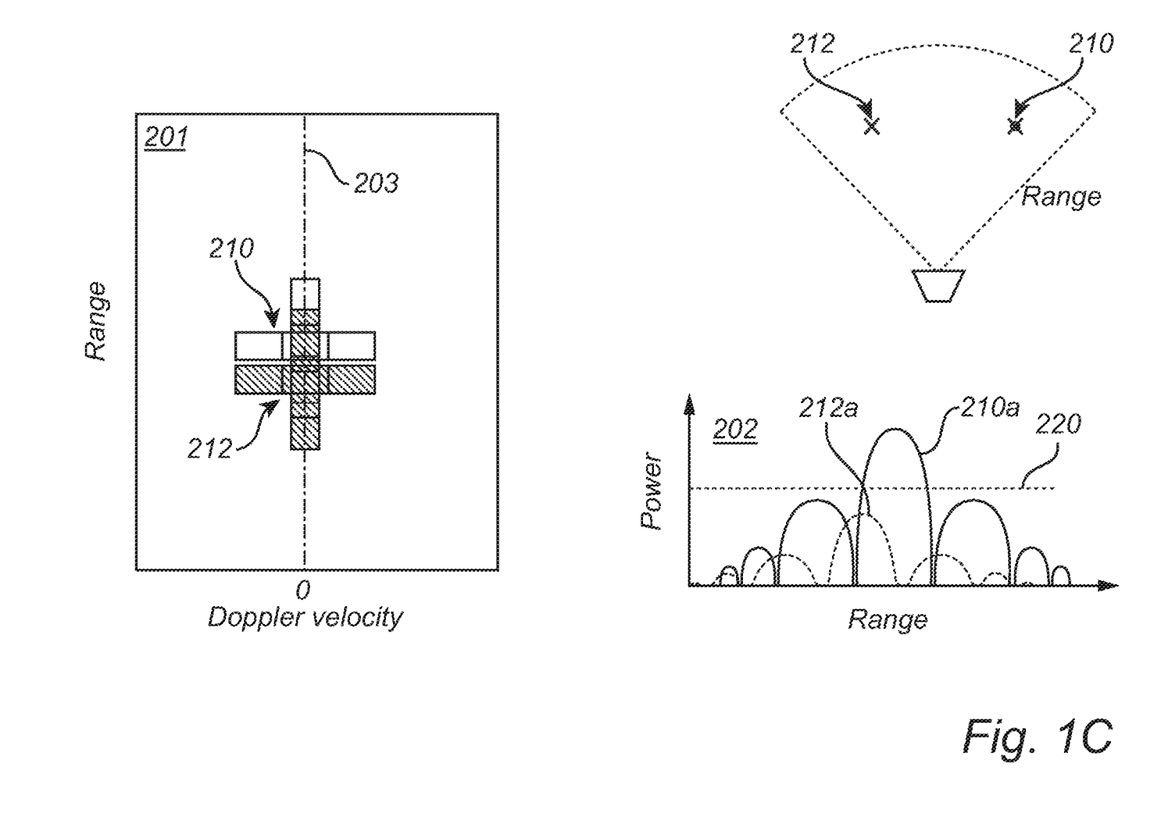
FIG. 1C is a conceptual range-doppler diagram and a power versus range diagram of a two static objects.

Turning to FIG. 1C there is shown another range-doppler plot 201, but now inducing two targets 210 and 212. The targets are at zero velocity and are thus considered static. In other words, in a corresponding power versus velocity plot similar to the one shown in FIG. 1B both peaks would be at zero velocity. In the power versus range plot 202 shown in FIG. 1C, the difference in range, i.e., the relative displacement in the y-axis along the zero-velocity line 203 in the range-doppler diagram, is reflected by the displacement of the corresponding peaks 212a and 210a in the plot 202. Since the peak 212a is lower than the peak 210a, and only the largest peak is selected for a given range, the object 212 is considered "invisible", i.e., it is not detected by the radar. However, the overlap between the lobes 212a and 210a as well as their side lobes indicate spectral leakage between two non-zero detections that may lead to a confirmed detection. Each lobe may be considered to represent a bin.

Figure 1D:
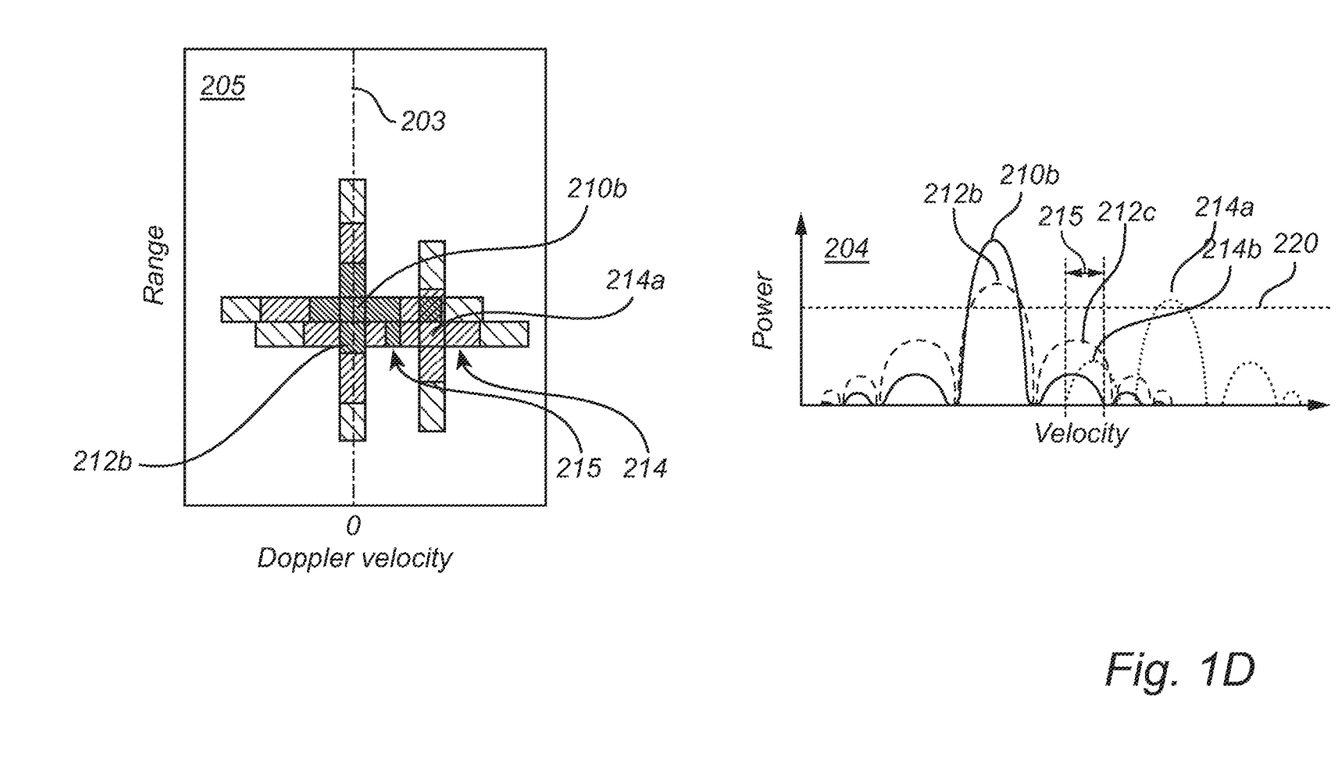
FIG. 1D is a conceptual range-doppler diagram and a power versus range diagram of radar signals of a static object and a moving object.

Now turning to FIG. 1D where a moving object 214 is introduced. In the range-doppler diagram 205, the moving object representation 214 is shifted to the right in the diagram 205, away from the zero-velocity axis 203. Further, the power versus Doppler velocity plot 204 illustrates the main lobes 210b, 212b, and 214a and their displacement relative each other. Again, the overlap between lobes indicate spill-over regions. In particular, the side lobes 212c belonging to the detection of the static object 212 which was not detectable as discussed in relation to FIG. 1C, and the side lobe 214b belonging to the detection of the moving object 214 overlap at 215 such that the sum of the signals (not shown to avoid cluttering the drawing), i.e., the sum of the overlap of the lobes 212c, 214c may exceed the detection threshold 220. Thus, not only is the detection of the non-zero velocity object made at the given range, as discussed in FIG. 1B, but also the detection of the combined lobes 212c and 214b, falling in a non-zero velocity bin, thereby producing a confirmed detection for the previously "invisible" static object 212. The velocity of the object 214 is sufficiently low to cause spill-over into the same bin, i.e., into lobe 212c belong to the non-zero detection of the object 212. Still further, the velocity of the object 214 is sufficiently low such that the combined signal of lobes 212c and 214b exceeds the detection threshold 220.

Figure 1E:
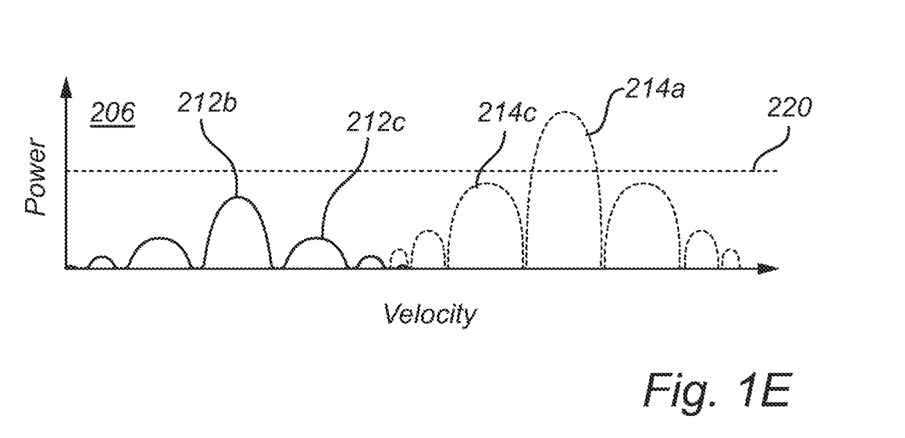
FIG. 1E is a conceptual power versus velocity diagram of radar signals of a static object and a moving object.

Had the velocity of the object 214 been substantially higher, as illustrated in the power versus velocity diagram 206 in FIG. 1E, then the sum of overlapping lobes, for example lobes 212c and 214c as discussed above, where spectral leakage may occur, would not lead to a confirmed detection, i.e., a combined signal that exceeds the threshold 220. Thus, the velocity of the object 214 is too high to cause spectral leakage that may lead to a confirmed detection with non-zero velocity.

The above realizations led to thresholding the detections such that detections are included with radar signal strength exceeding a detection threshold and with velocity falling in a zero velocity bin and with radar signal strength exceeding the detection threshold and with a non-zero velocity sufficiently low to cause spill over information in the same bin as detections falling in the zero velocity bin such that a non-zero velocity detection is made, i.e., a detection in a non-zero velocity bin.

Figure 2:
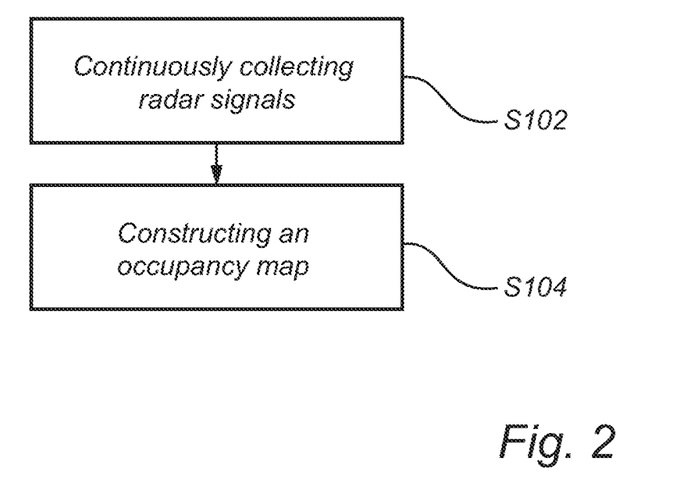
FIG. 2 is a flow-chart of method steps according to embodiments of the disclosure.

FIG. 2 is a flow-chart of method steps according to embodiments of the present disclosure.

In step S102, continuously collecting radar signals over time to detect a static scene using a set of receiver antennas of a stationary radar unit. The stationary radar unit 100 is operative to transmit radar signals towards a scene 1 and comprises a set of receiver antennas configured to detect radar signals from arbitrary directions. Accordingly, the stationary radar unit 100 does not utilize beamforming. The stationary radar unit 100 is configured to measure target velocity in discrete velocity bins, i.e., the velocity of a detected target is measured in discrete steps.

In step S104, constructing an occupancy map of the static scene using confirmed detections determined from the collected radar signals. The confirmed detections are detections that fulfils a radar signal strength exceeding a detection threshold and with velocity falling in a zero-velocity bin. Further, confirmed detections also include detections with radar signal strength exceeding the detection threshold and with a non-zero velocity sufficiently low to cause spill over information in the same bin as detections falling in the zero-velocity bin. As discussed above, this type of thresholding provides more information for mapping of a static scene compared to only detecting the fully static objects.

Figure 3:
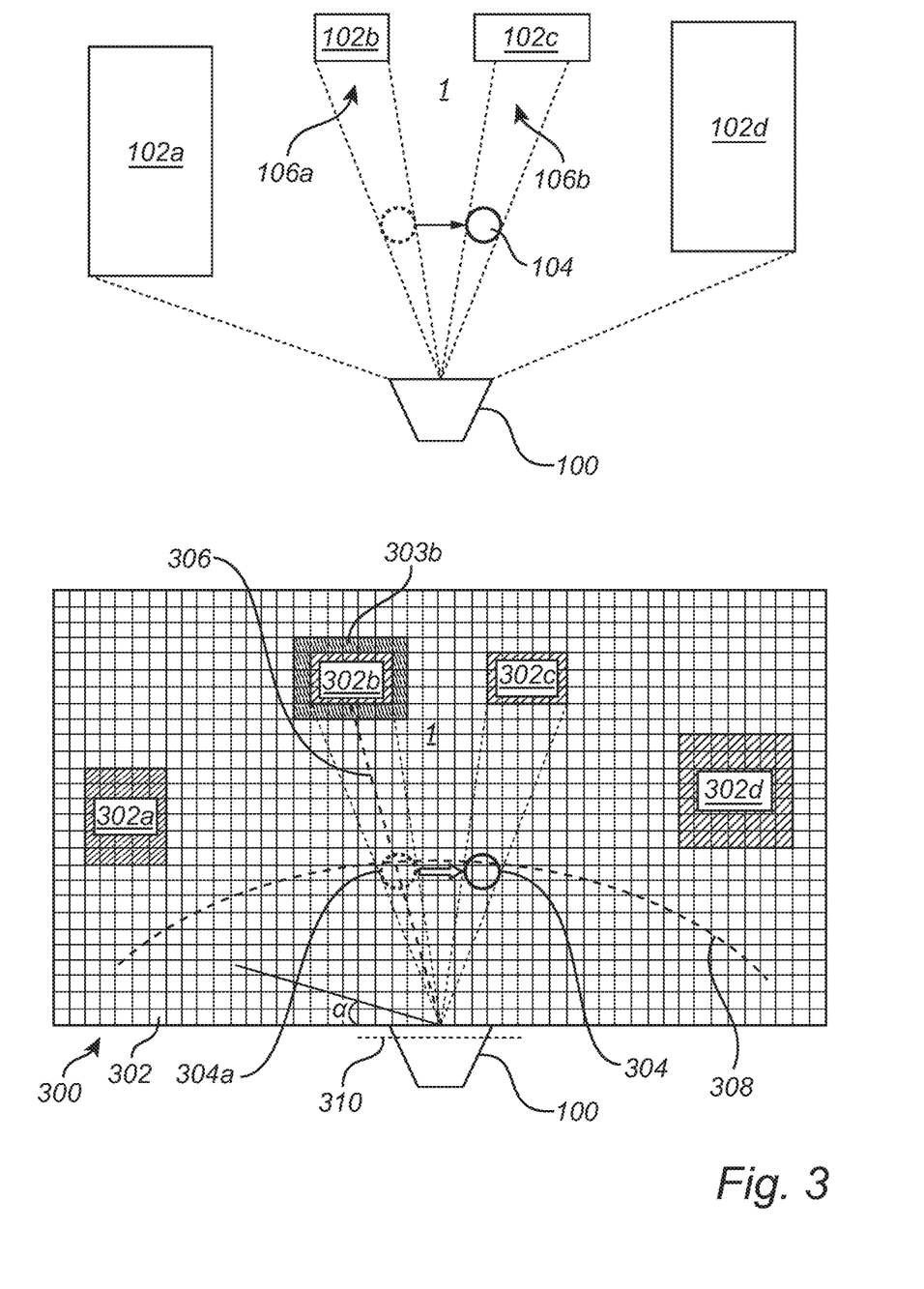
FIG. 3 conceptually illustrates the construction of an occupancy map according to embodiments of the disclosure.

FIG. 3 conceptually illustrates the construction of an occupancy map of the scene 1 by considering probability values in an occupancy grid 300. The occupancy grid comprises a grid of cells 302 where only one cells 302 is denoted in FIG. 3.

When a detection made by the radar unit 100 is confirmed by an algorithm, the probability value in the corresponding cells of the grid is increased. For example, the cells denoted in groups 302a-d are cells in regions where confirmed detections have been made, and correspond to the static objects 102a-d, respectively. Thus, as further detections are made of the same static object over time, the probability increases further in the corresponding cells thereby increasing the likelihood of a static object present in the corresponding region. Note that since the occupancy map 300 is under construction, the regions 302a-d are smaller than the static objects 102a-d.

Further, to increase the contrast of the occupancy map, the probability is reduced in cells falling in regions between the confirmed detections and the location of the radar unit 100. This further provides for reducing the impact of moving objects to appear in the occupancy map 300. For example, at a first time instant, the moving object 104 covers the static object 102b. At this time, the probability in the region 304a will be increased and since the static object 102b is occluded by the moving object 104, the probability in the region of the object 302b will not change. However, the probability in the regions between the region 304a and the radar unit 100 is reduced. Subsequently, the moving object 104 moves to a position where is partly covers the object 102c such that the object 102b is now detectable by the radar unit 100. Thus, the probability value in the corresponding region 302b of the occupancy map 300 is increased, and the probability in regions between the region 302b and the radar unit 100 is reduced. Over time, the detection made in region 304a will fade out. Consequently, detections of static objects 102a-d will appear in the occupancy map 300.

Further, the regions of the occupancy map that are reduced preferably intersect a straight line 306 between the first region, e.g., the region in which a detection has been made, for example region 302b, and the location of the radar 100 in the occupancy map 300.

In addition, the occupancy probability value is increased in regions neighboring the first region. Again, taking the region 302b, in the current frame, as being the first region, if a detection is made in region 302b, the occupancy probability value may be increased also in region 303b adjacent to the region 302b.

The occupancy map 300 is constructed by aggregating detections over a time duration. In other words, the occupancy map 300 is filled with conformed detections, where detection only instantly made of moving objects, will be averaged out.

Figure 4A:
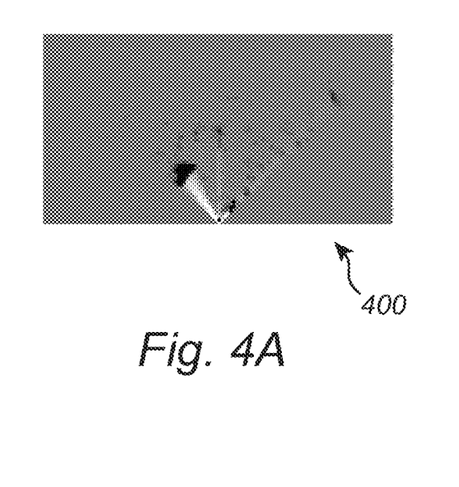
FIG. 4A-B illustrate two separate time instants of an example occupancy map being constructed according to embodiments of the disclosure.
Figure 4B:
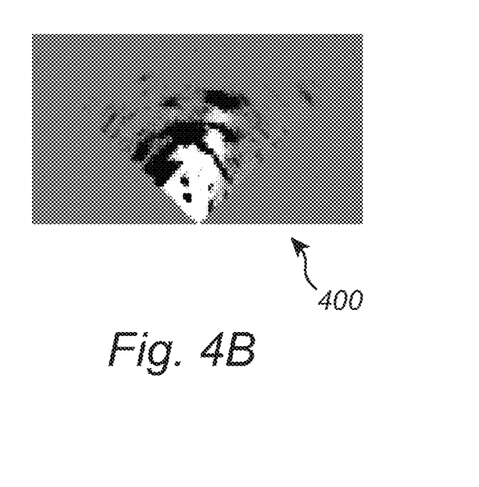

FIG. 4A-B illustrate two separate time instants of an example occupancy map 400 being constructed. FIG. 4A illustrates the occupancy map 400 at time t1 and FIG. 4B illustrates the occupancy map 400 at time t2, approximately 1 minute apart. During that time, a person has moved around in the scene, for example as exemplified by object 104 in FIG. 1A and FIG. 3. In FIG. 4A, only a small fraction of the static objects in the scene have been detected and marked with black. As time progresses, the occupancy map 400 is populated using the method described with reference to FIG. 3, and due to the mechanism described with reference to FIG. 1A, progressively more of the scene can be detected, i.e., more black regions appear that may correspond to walls of a building, and more white regions appear that may correspond to open areas such as a lawn or an empty parking lot.

The radar unit 100 operates by making detections at discrete radii and discrete velocities. During operation, one radar detection for each combination of discrete radii from the radar location and detection related to a velocity bin neighboring the zero-velocity bin is included in the occupancy map 300. Turning again to FIG. 3, the radius 308 conceptually illustrates one discrete radius 308, here intercepting regions 302a and 304a during the current frame. Here, a detection in the region 302a corresponds to a confirmed detection of an object with zero velocity, i.e., falling in the zero-velocity bin, and the detection in region 304a corresponds to a detection related to a velocity bin neighboring the zero-velocity bin.

Preferably, all confirmed detections are included in the occupancy map, for each of a set of discrete radii from the radar location.

Figure 5:
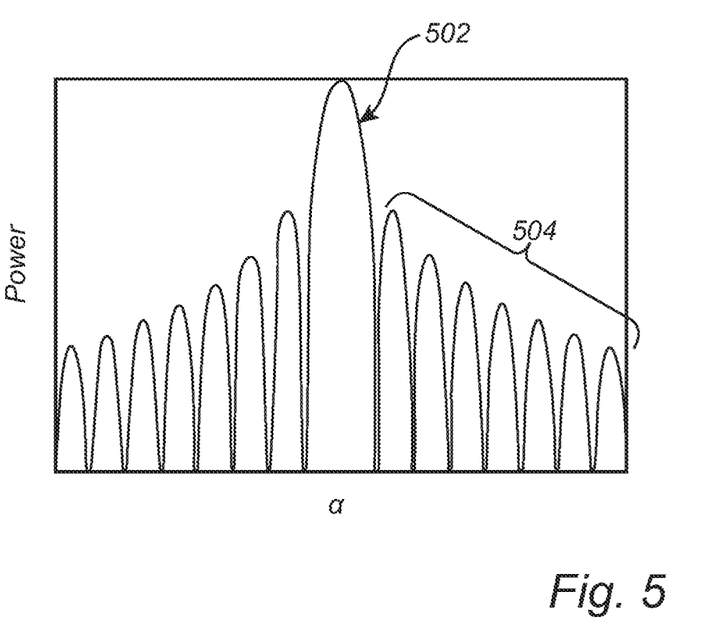
FIG. 5 is an example discrete Fourier spectrum of azimuth angle versus power according to embodiments of the disclosure.

As an example, when the occupancy map 300 or 400 is constructed, an azimuth angle of the confirmed detections is determined. The azimuth angle, a is the angle along the discrete radius 308 where a confirmed detection is made. During processing of radar detections, the Fourier transform, preferably the discrete Fourier transform of phase differences between radar signals is calculated. This generally results in a spectrum of different angles versus power as conceptually illustrated in FIG. 5, comprising a global peak 502, i.e., a peak with largest energy content, and a set of side lobes 504. Determining the azimuth angle, a, may be performed by calculating the discrete Fourier transform of phase differences between radar signals collected by different receiver antennas separated along a first axis 310 being parallel to the plane of the azimuthal, and selecting the frequency, i.e., azimuth angle, with the largest energy content in the discrete Fourier transform. It may also be possible to select more frequencies than just the one with the largest energy content, however, in a preferred embodiment, the frequency, i.e., azimuth angle, with the largest energy content is selected since it may be difficult to accurately determine whether peak is an actual target or just a side lobe. Similar selections made be made also for range detections and velocity detections. See also the discussion in relation to FIGS. 1A-E.

In a similar way, in case also elevation angle is considered, to provide a radar image along the elevation angle, constructing the occupancy map comprises determining an elevation angle of the confirmed detections by means of selecting a frequency with the largest energy content of a Fourier transform of phase differences between radar signals collected by different receiver antennas separated along a second axis perpendicular to the plane of the azimuthal.

This is performed in an analogous way to what was described with respect to the azimuth angle.

Figure 6:
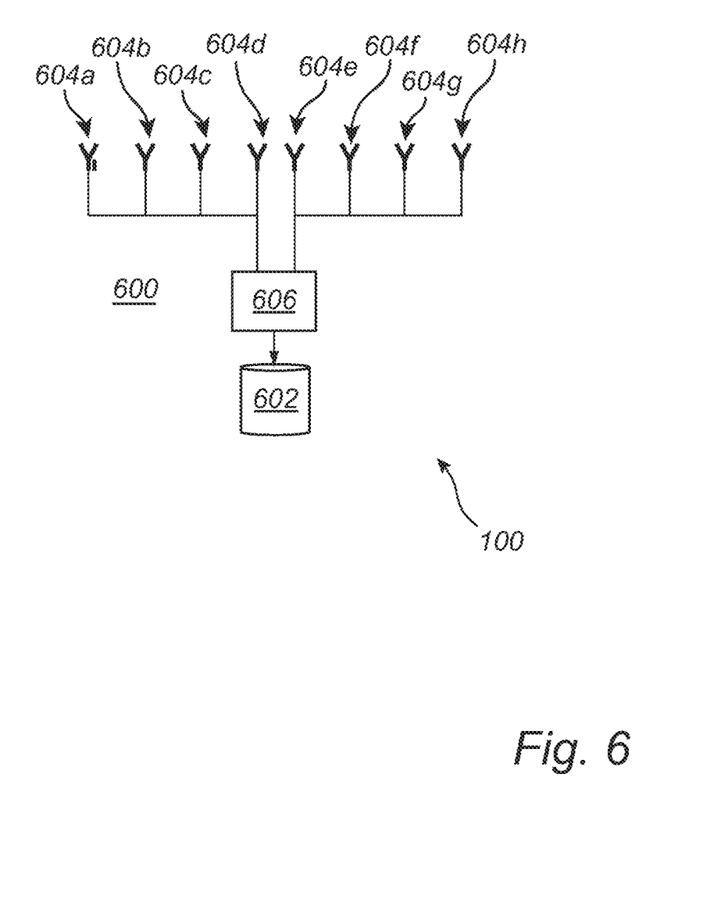
FIG. 6 is a block diagram of system according to embodiments of the disclosure.

FIG. 6 is a block diagram of a radar system 600 comprising a static radar and a control unit 602. The number of receiver antennas 604a-h of the stationary radar unit is no more than 16, preferably no more than 10, more preferably no more than 8. Here 8 receiver antennas are shown, i.e., representing a relatively simple and cheap radar unit 100. The stationary radar unit 100 may even be operative to transmit radar signals in all directions. Preferably, the radar unit 100 operates without utilizing beamforming.

The channels, i.e., antennas 604a-h may be a physical antenna or a virtual antenna. The antennas 604a-h may be implemented as virtual antennas of a MIMO (multiple-in multiple-out) radar. A receiver circuit 606 is adapted to receive radar signals from the antennas 604a-h and convert them to signals that may be acquired by the control unit 602. Such a receiver circuit may include e.g., mixers, filters, analogue-to-digital converters, etc. Such receiver circuits 606 may have different components and configurations depending on the specific implementation at hand.

The control unit 602 is configured to acquire data indicative of radar signals continuously collected over time to detect a static scene. The radar signals being detected by the antennas 604a-h.

Further, the control unit 602 is configured to construct an occupancy map of the static scene using confirmed detections determined from the acquired data. As discussed above, confirmed detections are detections with radar signal strength exceeding a detection threshold and with velocity falling in a zero velocity bin and detections with radar signal strength exceeding the detection threshold and with a non-zero velocity sufficiently low to cause spill over information in the same bin as detections falling in the zero velocity bin.

The control unit includes a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for mapping static objects in a scene using a stationary radar unit, mounted on a stationary entity such that the radar unit is not moving relative to the scene, adapted to detect signals from arbitrary directions without using beamforming or sweeping, and that is operative to transmit radar signals towards the scene, the stationary radar unit comprising a set of receiver antennas configured to detect the radar signals from arbitrary directions, and measure target velocity in discrete velocity bins, the method comprising:
   continuously collecting radar signals over time to detect static objects and moving objects in the scene using the set of receiver antennas of the stationary radar unit; and
   constructing an occupancy map of static objects in the scene using confirmed detections determined from the collected radar signals, where confirmed detections are detections with radar signal strength exceeding a detection threshold and with velocity falling in a zero velocity bin and detections with radar signal strength exceeding the detection threshold and with a non-zero velocity falling into a neighboring non-zero velocity bin that is sufficiently low to cause spill over information in the same bin as detections falling in the zero velocity bin and cause a detection in the zero velocity bin.

2. The method according to claim 1, wherein the number of receiver antennas is no more than 16.

3. The method according to claim 1, wherein constructing the occupancy map comprises, over time including, in the occupancy map, all detections with radar signal strength exceeding the detection threshold and with no velocity and all detections with radar signal strength exceeding the detection threshold and with non-zero velocity, for each of a set of discrete radii from the radar location.

4. The method according to claim 1, further comprising constructing the occupancy map by, for each confirmed detection, increase an occupancy probability value in a corresponding first region of the occupancy map, and reducing a probability value in regions between the first region and the location of the radar in the occupancy map.

5. The method according to claim 4, wherein the regions between the first region and the location of the radar in the occupancy map intersect a straight line between the first region and the location of the radar in the occupancy map.

6. The method according to claim 4, further comprising increasing the occupancy probability value in regions neighboring the first region.

7. The method according to claim 4, wherein the occupancy map being constructed by as an aggregate of the probability values over time.

8. The method according to claim 1, further comprising including, in the occupancy map, one radar detection for each combination of discrete radii from the radar location and detection related to a velocity bin neighboring the zero-velocity bin.

9. The method according to claim 1, wherein constructing the occupancy map comprises determining an azimuth angle of the confirmed detections by means of selecting a frequency with the largest energy content of a Fourier transform of phase differences between radar signals collected by different receiver antennas separated along a first axis.

10. The method according to claim 1, wherein constructing the occupancy map comprises determining an elevation angle of the confirmed detections by means of selecting a frequency with the largest energy content of a Fourier transform of phase differences between radar signals collected by different receiver antennas separated along a second axis.

11. The method according to claim 1, wherein the stationary radar unit is operative to transmit radar signals in arbitrary directions.

12. The method of claim 1, wherein the stationary radar unit remains in a fixed position during the collection of the radar signals.

13. The method of claim 1, wherein the stationary radar unit is a modulated continuous wave radar unit that detects radar signals without using beamforming techniques.

14. The method of claim 1, wherein the stationary radar unit is attached to an object, wherein the object is a non-vehicle.

15. The method of claim 1, wherein the radar signals are transmitted towards the scene without using beamforming.

16. A non-transitory computer readable recording medium comprising a computer program comprising instructions which, when the program is executed by a computer, cause the computer to carry out the a method for mapping of static objects in a scene using a stationary radar unit, mounted on a stationary entity such that the radar unit is not moving relative to the scene, adapted to detect signals from arbitrary directions without using beamforming or sweeping, and that is not moving relative the scene and that is operative to transmit radar signals towards the scene, the stationary radar unit comprises comprising a set of receiver antennas configured to detect the radar signals from arbitrary directions, and the stationary radar unit is configured to measure target velocity in discrete velocity bins, the method comprising:

continuously collecting radar signals over time to detect static objects and moving objects in in the scene using the set of receiver antennas of the stationary radar unit; and constructing an occupancy map of static objects in the scene using confirmed detections determined from the collected radar signals, where confirmed detections are detections with radar signal strength exceeding a detection threshold and with velocity falling in a zero velocity bin and detections with radar signal strength exceeding the detection threshold and with a non-zero velocity falling into a neighboring non-zero velocity bin that is sufficiently low to cause spill over information in the same bin as detections falling in the zero velocity bin and cause a detection in the zero velocity bin.

17. A control unit for mapping of static objects in a scene using radar signals collected by a stationary radar unit, mounted on a stationary entity such that the radar unit is not moving relative to the scene, adapted to detect signals from arbitrary directions without using beamforming or sweeping, and that is operative to transmit radar signals towards the scene and to detect the radar signals from arbitrary directions using a set of receiver antennas, the stationary radar unit is configured to measure target velocity in discrete velocity bins, the control unit is configured to:

acquire data indicative of radar signals continuously collected by the stationary radar unit over time to detect static objects and moving objects in a scene; and construct an occupancy map of static objects in the scene using confirmed detections determined from the acquired data, where confirmed detections are detections with radar signal strength exceeding a detection threshold and with velocity falling in a zero velocity bin and detections with radar signal strength exceeding the detection threshold and with a non-zero velocity falling into a neighboring non-zero velocity bin that is sufficiently low to cause spill over information in the same bin as detections falling in the zero velocity bin and cause a detection in the zero velocity bin.

18. A radar system comprising a static radar and a control unit for mapping of static objects in a scene using radar signals collected by a stationary radar unit, mounted on a stationary entity such that the radar unit is not moving relative to the scene, adapted to detect signals from arbitrary directions without using beamforming or sweeping, and that is operative to transmit radar signals towards the scene and to detect the radar signals from arbitrary directions using a set of receiver antennas, the stationary radar unit is configured to measure target velocity in discrete velocity bins, the control unit is configured to:

acquire data indicative of radar signals continuously collected by the stationary radar unit over time to detect static objects and moving objects in a scene; and construct an occupancy map of static objects in the scene using confirmed detections determined from the acquired data, where confirmed detections are detections with radar signal strength exceeding a detection threshold and with velocity falling in a zero velocity bin and detections with radar signal strength exceeding the detection threshold and with a non-zero velocity falling into a neighboring non-zero velocity bin that is sufficiently low to cause spill over information in the same bin as detections falling in the zero velocity bin and cause a detection in the zero velocity bin.

19. The radar system according to claim 18, wherein the number of receiver antennas of the stationary radar unit is no more than 16.

* * * * *